(12) United States Patent
Kim et al.

(10) Patent No.: US 12,141,308 B2
(45) Date of Patent: Nov. 12, 2024

(54) OFFLINE DATA STORAGE DEVICE

(71) Applicant: DataLocker Inc., Overland Park, KS (US)

(72) Inventors: Jay W. Kim, Leawood, KS (US); David Kim, Gyeonggi-do (KR); Kean Sananikone, Olathe, KS (US)

(73) Assignee: DataLocker Inc., Overland Park, KS (US)

( * ) Notice: Subject to any disclaimer, the term of this patent is extended or adjusted under 35 U.S.C. 154(b) by 0 days.

(21) Appl. No.: 17/751,742

(22) Filed: May 24, 2022

(65) Prior Publication Data

US 2022/0284116 A1    Sep. 8, 2022

Related U.S. Application Data

(62) Division of application No. 16/853,017, filed on Apr. 20, 2020, now Pat. No. 11,693,980.

(60) Provisional application No. 62/836,393, filed on Apr. 19, 2019.

(51) Int. Cl.
| | |
|---|---|
| *G06F 21/00* | (2013.01) |
| *G06F 3/04886* | (2022.01) |
| *G06F 9/4401* | (2018.01) |
| *G06F 21/62* | (2013.01) |
| *H04L 9/40* | (2022.01) |
| *H04L 67/1097* | (2022.01) |

(52) U.S. Cl.
CPC ...... *G06F 21/6218* (2013.01); *G06F 3/04886* (2013.01); *G06F 9/4418* (2013.01); *H04L 63/083* (2013.01); *H04L 63/102* (2013.01); *H04L 67/1097* (2013.01)

(58) Field of Classification Search
CPC ............. G06F 21/6218; G06F 3/04886; G06F 9/4418; H04L 63/083; H04L 63/102; H04L 67/1097
See application file for complete search history.

(56) References Cited

U.S. PATENT DOCUMENTS

| | | | | |
|---|---|---|---|---|
| 7,707,142 B1* | 4/2010 | Ionescu | ................... | G06F 16/95 |
| | | | | 707/999.003 |
| 8,266,378 B1* | 9/2012 | Jevans | ................. | G06F 12/1466 |
| | | | | 711/115 |
| 9,858,736 B2* | 1/2018 | Tseng | ................. | G07C 9/00174 |

(Continued)

OTHER PUBLICATIONS

Po-Chun Huang et al., Joint Management of Performance-predictable Virtualized Storage Devices with Hard Disk and Flash Memory, Oct. 1, 2013, ACM, pp. 461-466. (Year: 2013).*

(Continued)

*Primary Examiner* — Kari L Schmidt
*Assistant Examiner* — Fahimeh Mohammadi
(74) *Attorney, Agent, or Firm* — Hovey Williams LLP; Kameron D. Kelly (57) ABSTRACT

Systems, devices, and/or computer-implemented methods for secure offline data storage are provided herein. More particularly, a system is provided that permits access to a data storage device when offline from various components of the system. Furthermore, the disclosed system may permit the re-setting of authentication passwords/PINs for the data storage devices, even when such data storage devices are offline from other components of the system.

10 Claims, 6 Drawing Sheets

(56) References Cited

U.S. PATENT DOCUMENTS

| | | | | |
|---|---|---|---|---|
| 2003/0182584 A1* | 9/2003 | Banes | ............... | G06F 21/34 |
| | | | | 713/182 |
| 2004/0123127 A1* | 6/2004 | Teicher | ............ | G06F 21/78 |
| | | | | 713/193 |
| 2007/0266258 A1* | 11/2007 | Brown | ............ | H04L 63/00 |
| | | | | 713/183 |
| 2007/0280483 A1* | 12/2007 | Fu | ............ | H04L 9/0822 |
| | | | | 380/286 |
| 2008/0022393 A1* | 1/2008 | Waltermann | ........ | G06F 21/31 |
| | | | | 726/18 |
| 2010/0017575 A1* | 1/2010 | Kim | ............ | G06F 12/1458 |
| | | | | 711/E12.001 |
| 2011/0016515 A1* | 1/2011 | Dhanakshirur | ....... | G06F 21/42 |
| | | | | 726/6 |
| 2012/0005747 A1* | 1/2012 | Tribble | ............ | G06F 21/34 |
| | | | | 726/18 |
| 2013/0055382 A1* | 2/2013 | Bhattiprolu | ........ | G06F 21/572 |
| | | | | 726/19 |
| 2013/0061315 A1* | 3/2013 | Jevans | ............ | G06F 21/79 |
| | | | | 726/17 |
| 2013/0067564 A1* | 3/2013 | Fok Ah Chuen | ... | G06F 21/6218 |
| | | | | 726/17 |
| 2013/0276077 A1* | 10/2013 | Xiong | ............ | G06F 21/45 |
| | | | | 726/6 |
| 2014/0330726 A1* | 11/2014 | Ball | ............ | G06F 21/34 |
| | | | | 713/184 |
| 2015/0113589 A1* | 4/2015 | Lemaster | ........ | H04L 63/20 |
| | | | | 726/1 |

OTHER PUBLICATIONS

Stanislaw Jarecki et al., Device-Enhanced Password Protocols with Optimal Online-Offline Protection, May 30, 2016, ACM, pp. 177-188. (Year: 2016).*

Boris Dolgunov, Enabling Optimal Security for Removable Storage Devices, Nov. 27, 2007, IEEE, pp. 15-21. (Year: 2007).*

Debiao He et al., Enhanced Three-factor Security Protocol for Consumer USB Mass Storage Devices, Feb. 2014, IEEE, vol. 60, Issue: 1, pp. 30-37. (Year: 2014).*

* cited by examiner

OFFLINE DATA STORAGE DEVICE

RELATED APPLICATION

This continuation patent application claims priority to U.S. patent application Ser. No. 16/853,017 entitled "OFFLINE DATA STORAGE DEVICE," filed Apr. 20, 2020, which claims priority benefit under 35 U.S.C. § 119(e) of U.S. Provisional Patent Application Ser. No. 62/836,393 entitled "OFFLINE DATA STORAGE DEVICE," filed Apr. 19, 2019, the entire disclosures of which are incorporated herein by reference.

FIELD

Embodiments of the present invention are directed to systems, devices, and/or computer-implemented methods for secure offline data storage. Certain specific embodiments of the present invention may comprise a system or method configured to permit access to data storage devices when offline from various components of the system. Such embodiments may also permit the re-setting of authentication passwords for the data storage devices, even when such data storage devices are offline from other components of the system.

BACKGROUND

Data security is a high priority with generally all aspects of computing devices, including mobile electronic devices and/or data storage devices (e.g., which may come in the form of portable data storage devices). The use of data storage devices, in particular, has become prevalent for securely storing confidential business and personal information.

To prevent unauthorized access to data storage devices (or other computing devices), unique authentication passwords and/or personal identification numbers (PINs) are often used. For instance, a user of a data storage device may be required to enter an authentication password/PIN to access the data storage device (e.g., to store and retrieve data on the device). However, some data storage devices require access to a separate system, e.g., access to a server over a communications network, to further authenticate access to the data storage device. If the communications network is not available (e.g., the portable data storage device is "offline"), then the user may be unable to gain access the portable data storage device. Furthermore, in some instances, it may be necessary, or at least preferable, for the user to change his/her authentication password/PIN. However, if the communications network is not available (e.g., the portable data storage device is "offline") then the user may be unable to change his/her authentication password/PIN.

SUMMARY

One or more embodiments of the present invention include a data storage device comprising a secure memory configured to securely store data, a processor, and a communications port configured to connect the data storage device with a host device. The data storage device is configured to connect with a remote device over a communications network. The data storage device is associated with an offline occurrence value indicative of a number of occurrences that the data storage device is permitted to connect in data communication with the host device while the data storage device is offline and unable to connect with the remote device over the communications network. The data storage device is configured to determine, based on the offline occurrence value, whether the data storage device is permitted to connect in data communication with the host device. The data storage device is configured to modify the offline occurrence value upon each occurrence of the data storage device being in data communication with the host device.

One or more embodiments of the present invention include a computer-implemented method for authorizing a data storage device to be in data communication with a host device. The method comprising a step of providing the data storage device, with the data storage device being configured to connect with a remote device over a communications network. The data storage device is associated with an offline occurrence value indicative of a number of occurrences that the data storage device is permitted to connect in data communication with the host device while the data storage device is unable to connect with the remote device over the communications network. An additional step includes coupling the data storage device with the host device. An additional step includes receiving a password via the data storage device. An additional step includes determining, based on the offline occurrence value, whether the data storage device is permitted to connect in data communication with the host device. A further step includes authorizing the data storage device to be in data communication with the host device, and modifying the offline occurrence value.

One or more embodiments of the present invention include a method, such as a computer-implemented method, for authorizing a data storage device to be in data communication with a host device. Generally, the data storage device is configurable in either an online mode or an offline mode. The method may comprise one step of configuring the data storage device in the online mode. The data storage device is associated with a counter value indicative of a maximum number or occurrences that the data storage device is permitted to connect in data communication with the host device. An additional step includes coupling the data storage device with the host device. An additional step includes receiving a password via the data storage device. An additional step includes determining if the counter value is greater than a minimum value. An additional step includes if the counter value is greater than the minimum value, authorizing the data storage device to be in data communication with the host device, and reducing the counter value. A further step includes if the counter value is less than or equal to the minimum value, restrict the data storage device from data communication with the host device unless authorized by a remote device.

One or more embodiments of the present invention include a data storage device comprising a secure memory configured to securely store data, a processor, a key input configured to receive information from a user, and a communications port configured to connect the data storage device with a host device. The data storage device is configured to perform a number of steps. One step includes storing a password reset code on the data storage device. An additional step includes receiving the password reset code via the key input. validate the password reset code received via the key input. An additional step includes deactivating the password reset code for use with the data storage device. An additional step includes receiving an updated password for the data storage device via the key input. A further step includes providing access to the secure memory of the data storage device based on the validation of the password reset code.

One or more embodiments of the present invention include a computer-implemented method for changing a password for a data storage device when the data storage device is offline and disconnected from a remote device. The method comprises a step of storing a password reset code on the data storage device. An additional step includes receiving the password reset code via a key input of the data storage device. An additional step includes validating the password reset code received via the key input. An additional step includes deactivating the password reset code for use with the data storage device. An additional step includes receiving an updated password for the data storage device via the key input. A further step includes providing access to a secure memory area of the data storage device.

One or more embodiments of the present invention include a method, such as a computer-implemented method, for changing a password for a data storage device when the data storage device is offline. The method comprises a step of storing a password reset code on the data storage device. An additional step includes receiving the password reset code via a key input of the data storage device. An additional step includes validating the password reset code received via the key input. An additional step includes deactivating the password reset code for use with the data storage device. An additional step includes receiving an updated password for the data storage device via the key input. A further step includes providing access to a secure memory area of the data storage device.

BRIEF DESCRIPTION OF THE DRAWINGS

Embodiments of the present invention are described herein with reference to the following drawing figures, wherein.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

System

Figure 1:
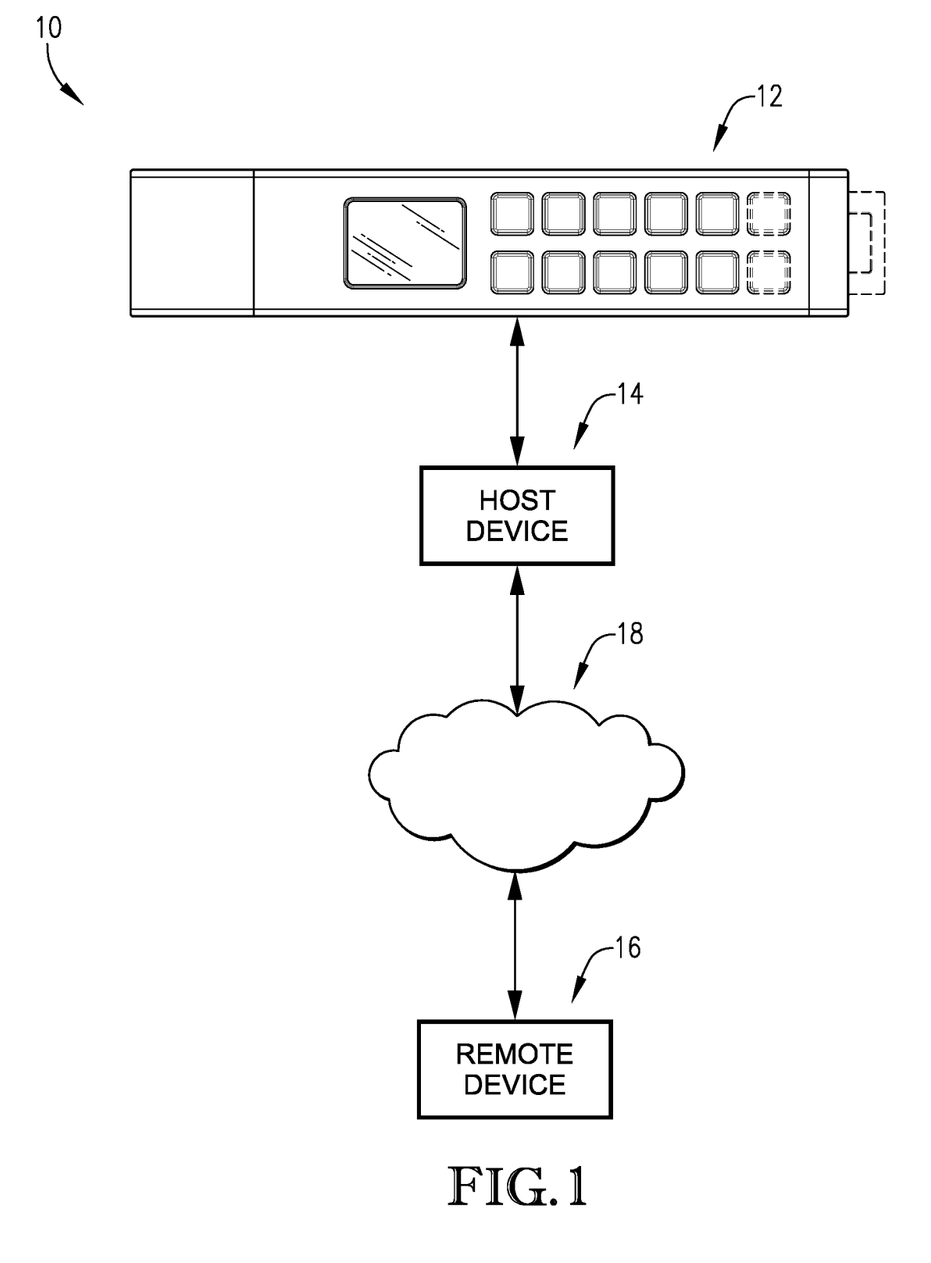
FIG. 1 depicts an exemplary system for offline secure data storage according to embodiments of the present invention.

Embodiments of the present invention may include a system 10, as illustrated in FIG. 1, for secure offline data storage. The system 10 may include a data storage device 12 configured to securely store and to provide access to data. In some embodiments, the data storage device 12 may be similar to and/or include one or more of the features of the data storage device disclosed in commonly-owned U.S. Pat. No. 8,185,709, the entire disclosure of which is incorporated herein by reference. For example, the data storage device 12 according to embodiments of the present invention may comprise one or more memory elements and one or more processing elements (See, e.g., FIG. 1A). The memory elements may comprise flash drives or hard drives for securely storing data. In some embodiments, the data storage device 12 may securely store data on one or more of the memory elements (hereinafter referred to as a "secure memory") by restricting access to the secure memory and/or by storing the data on the secure memory in an encrypted fashion. For example, the processing elements may be configured to encrypt data provided to the data storage device 12 prior to the data being stored on or written to the secure memory. Correspondingly, the processing elements may be configured to decrypt data stored on the data storage device 12 prior to the data being read from the secure memory.

Figure 1A:
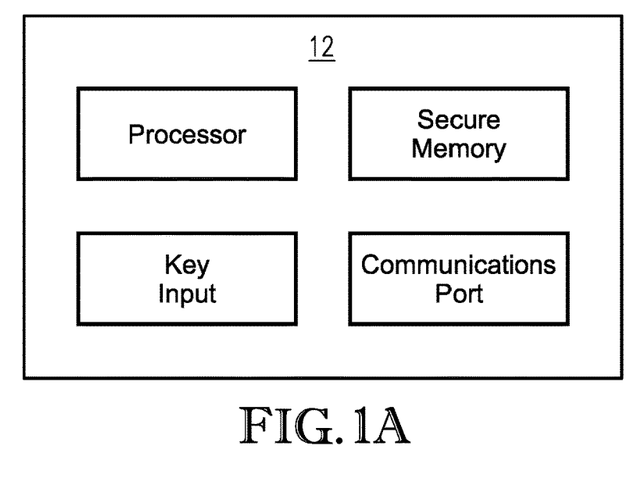
FIG. 1A depicts a schematic diagram of a data storage device according to embodiments of the present invention.

Furthermore, the data storage device 12 may contain a key input unit (e.g., a keypad, a keyboard, a touchscreen, etc.) configured to allow a user to input information, such as an authentication password or PIN, into the data storage device 12. The key input unit may comprise a combination of character and/or numeral keys (e.g., 0, 1, 2, 3, 4, 5, 6, 7, 8, or 9). In other embodiments, the data storage device 12 may be in communication (e.g., via Bluetooth) with a separate device, such as a mobile device (e.g., a smartphone or tablet), and the user may be enter the authentication password/PIN via the separate device. Regardless, the processing element of the data storage device 12 may authenticate the authentication password/PIN entered by a user to determine if the user is authorized to have access to the data storage device 12 (e.g., to write and read data to/from the memory elements of the data storage device 12). For example, the data storage device 12 may store a device password/PIN, and that the data storage device 12 can compare the authentication password/PIN entered by the user with the device password/PIN stored on the data storage device 12. If the password/PINs match, the user will be granted access to the data storage device 12. In some specific embodiments, the data storage device 12 may store an encrypted representation of the device password/PIN for comparison with the authentication password/PIN entered by the user. As such, when the user enters the authentication password/PIN, such authentication password/PIN may be encrypted before it is compared with the encrypted version of the device password/PIN stored on the data storage device 12.

Broadly, then, embodiments of the present invention include the data storage device 12 that comprise a one or more memory elements (e.g., a secure memory) that securely stores data, a communications port that connects with an external computing device for reading and writing data to the secure memory, a key input that receives an authentication password/PIN from a user, and one or more processors that authenticates the authentication password/PIN entered by a user. The one or more processors of the data storage device 12 may also control access to the secure memory, such as by selectively restricting access to the secure memory and/or by encrypting/decrypting data written to or read from the secure memory.

Figure 1B:
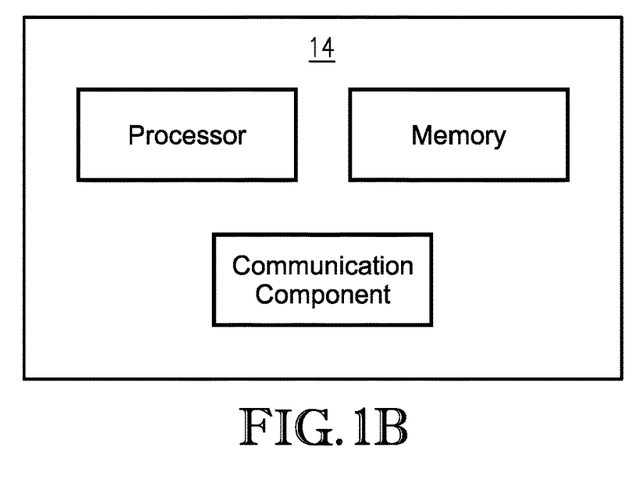
FIG. 1B depicts a schematic diagram of a host device according to embodiments of the present invention.

Returning to the system 10, illustrated in FIG. 1, to provide access to the data held in the data storage device 12, some embodiments may require the data storage device 12 to be physically, or otherwise communicatively, coupled with a host device 14, which may generally be any type of computing device with one or more processing elements, one or more memory elements, and/or one or more communications components/ports (See, e.g., FIG. 1B). For example, the host device 14 may comprise a desktop, a laptop, a mobile device, a tablet, etc. Such coupling may, in some embodiments, be provided via a USB connection present between the data storage device 12 and the host device 14. However, other connections may be used, such as other wired connections (e.g., serial connection) or various types of wireless connections (e.g., WiFi, Bluetooth, Cellular, etc.). Upon coupling the data storage device 12 with the host device 14, a user may be required to enter an authentication password/PIN into the key input associated with the data storage device 12. The data storage device 12 can, thus, validate the entered authentication password/PIN, as was previously described. The entry of a correct password/PIN may "unlock" the data storage device 12 for data communication with the host device 14, such that data can be read from or stored on the data storage device 12 via the host device 14. As used herein, the term connected in "data communication" means a connection that permits the host device 14 (or another device) to read and/or write data to the data storage device 12. In some additional embodiments, access to the data storage device 12 by the host device 14 may also require that the data storage device 12 be validated by a security policy stored on the host device 14. Such a security policy may comprise software, computer program, code segment, script, or other instruction stored on memory elements (and/or as firmware) of the host device 14 and used to validate the data storage device 12.

Figure 1C:
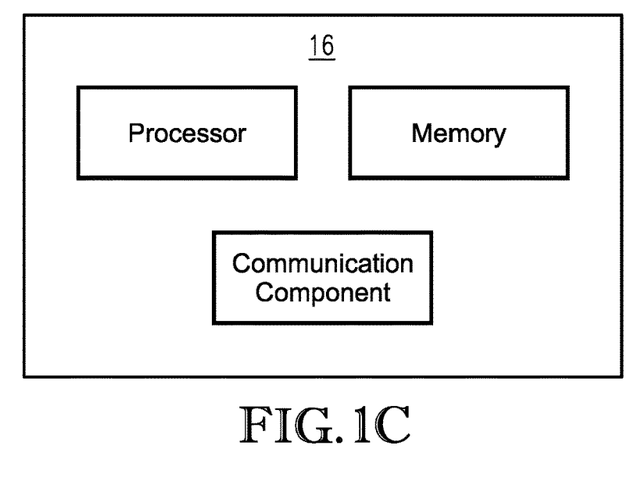
FIG. 1C depicts a schematic diagram of a remote device according to embodiments of the present invention.

In even further embodiments, access to the data storage device 12 may further, or alternatively, require that the data storage device 12 be validated by a security policy stored on a remote device 16 (with the remote device being illustrated in FIG. 1). The remote device 16 may comprise generally any type of computing device with processing elements, memory elements, and/or communications components/ports (See, e.g., FIG. 1C). For example, in some embodiments, the remote device 16 may comprise one or more desktop computers, server devices, or the like. The security policy of the remote device 16 may comprise software, computer program, code segment, script, or other instruction stored on memory elements (and/or as firmware) of the remote device 16 and used to validate the data storage device 12. In some embodiments, the security policy may be included as part of a central management software operated by the remote device 16 for purposes of managing, controlling access to, and/or auditing a plurality of data storage devices 12. For example, a company may use the central management software on a remote device 16 to manage a plurality of data storage devices 12 used by the company's employees.

Regardless, the remote device 16 may be in communication with the host device 14 and/or the data storage device 12 over a communications network 18 (e.g., LAN, WAN, etc.). Generally, the communications network 18 may be selected from one or more of the following networks: cellular, WiFi, and/or the Internet. In previously-used central management software, the data storage device 12 would be required to be "online" or connected with the remote device 16 in order to permit access to the secure memory of the data storage device 12. However, as provided herein, embodiments of the present invention facilitate access to the secure memory area of the data storage device 12 even if the data storage device 12 is "offline" or disconnected from the remote device 16. As used herein, the term "online" means that the data storage device 12 (or other device) has access to the communications network 18 (perhaps through connection with the host device 14) so as to facilitate communication with other devices, such as the remote device 16. In contrast, the term "offline" means that the data storage device 12 (or other device) does not have access to the communications network 18 thereby preventing communication with other devices, such as the remote device 16.

As used herein, such as with reference to the data storage device 12, the host device 14, and/or the remote device 16, the terms "processor," "processing element," and the like, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are illustrative only, and are thus not intended to limit in any way the definition and/or meaning of the term "processor." In particular, a "processor" may include one or more processors individually or collectively performing the described operations. In addition, the terms "software," "computer program," and the like, may, unless otherwise stated, broadly refer to any executable code stored in memory elements for execution on mobile devices, clusters, personal computers, workstations, clients, servers, and a processor or wherein the memory elements include read-only memory (ROM), electronic programmable read-only memory (EPROM), random access memory (RAM), erasable electronic programmable read-only memory (EEPROM), and non-volatile RAM (NVRAM) memory. The above described memory types are examples only, and are thus not limiting as to the types of memory usable for storage of a computer program. As such, the term "memory" "memory elements," "storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The terms "computer," "computing device," "computer system," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "network," "communications network," and the like, such as the communications network 18 as used herein, may, unless otherwise stated, broadly refer to substantially any suitable wired or wireless technology for facilitating communications (e.g., GSM, CDMA, TDMA, WCDMA, LTE, EDGE, OFDM, GPRS, EV-DO, UWB, WiFi, IEEE 802 including Ethernet, WiMAX, and/or others), including supporting various local area networks (LANs), personal area networks (PAN), or short-range communications protocols. The computing devices discussed herein, such as the data storage device 12, the host device 14, and/or the remote device 16, may include the necessary communication components to communicate over the communication network 18. For example, the term "communication component," "communication interface," "communication port" and the like, may, unless otherwise stated, broadly refer to substantially any suitable technology for facilitating communications, and may include serial ports/hubs (e.g., USB), one or more transceivers (e.g., WWAN, WLAN, and/or WPAN transceivers) functioning in accordance with IEEE standards, 3GPP standards, or other standards, and/or otherwise configured to receive and transmit signals via the communications network 18.

One or more (or all) of the functions described herein may be performed by one or more computer programs stored on memory elements being executed by a processor or processors associated with one or more of the devices disclosed herein, e.g., the data storage device 12, the host device 14, and/or the remote device 16 Specifically, one or more of the memory elements of such devices may comprise a computer-readable storage media or medium comprising a non-transitory medium including an executable computer program stored thereon. The computer program preferably instructs one or more processing elements to perform some or all of the operations described herein, including some or all of the operations of the computer-implemented methods described herein. The computer program stored on the computer-readable medium may instruct the processor and/or other components of the system to perform additional, fewer, or alternative operations, including those discussed elsewhere herein.

Operation

Figure 2:
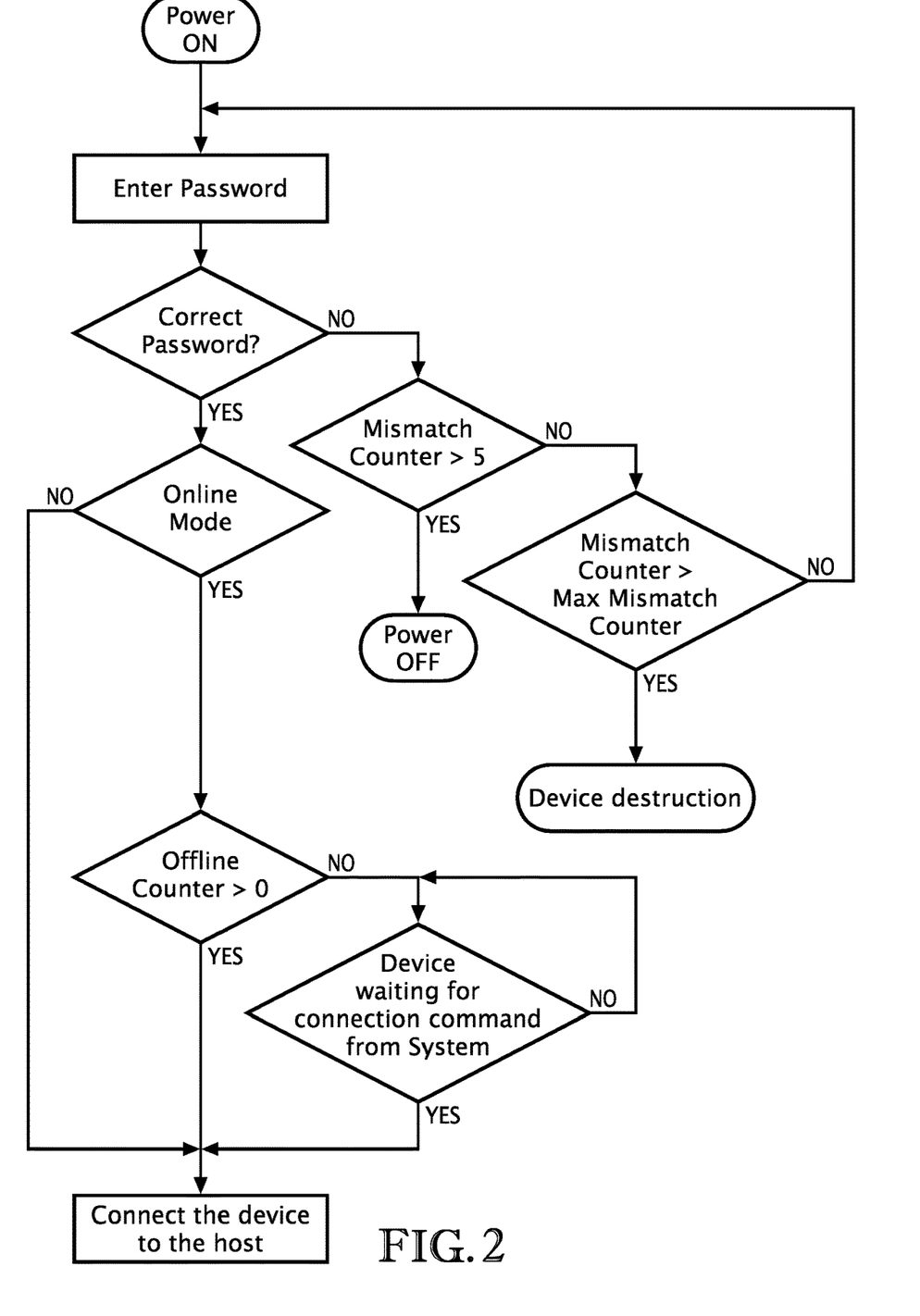
FIG. 2 depicts a flow chart that illustrates how an exemplary data storage device can be accessed in either an Offline Mode or an Online Mode.

Turning now to the functionality of the data storage device 12 in more detail, embodiments of the present invention provide for the data storage device 12 to be configured in a plurality of different configurations, which can regulate how the data storage device 12 may be authorized for data communication with the host device 14. Such authorization may, in some embodiments, require further steps beyond simply entering the authentication password/PIN into the key input of the data storage device 12 (and validating such authentication password/PIN). For example, FIG. 2 shows a flow chart, which illustrates how the data storage device 12 can be accessed in either an "Offline Mode" or an "Online Mode." In the Offline Mode, the data storage device 12 can be in data communication with the host device 14 without the data storage device 12 needing to be further authorized by the remote device 16. Thus, the host device can access the data storage device 12 even when the data storage device 12 is "offline," i.e., not in communication with the remote device 16 over the communication network 18. However, in some embodiments, when in the Offline Mode, the data storage device 12 may nonetheless require additional authorization by the host device 14 (e.g., via a security policy on the host device 14).

In contrast, when in the Online Mode, the data storage device 12 may generally be required to be "online," i.e., in communication with the remote device 16 over the communication network 18, to authorize data communication between the data storage device 12 and host device 14 (e.g., via approval from the central management software of the remote device 16). A user of the data storage device 12 may configure the data storage device 12 in either the Offline Mode or the Online Mode. However, in some embodiments, and administrative user may be required to transition the data storage device between the Offline Mode or the Online Mode. In some specific embodiments, for example, a data storage device 12 may only be shifted between Offline and Online Modes via an administrative user operating the central management software of the remote device 16

Notwithstanding the above, embodiments of the present invention may provide for the data storage device 12 to be in data communication with the host device 14 even when the data storage device is in the Online Mode. Specifically, embodiments may provide for the data storage device to be configured with a preset number of permitted offline connection occurrences, with each providing the data storage device 12 with a single authorization to be connected in data communication with the host device 14 without requiring further authorization from the remote device 16. The number of offline connection occurrences/permissions may be managed and/or tracked by an Offline Counter associated with the remote storage device 12. The Offline Counter may be a software or firmware-implemented process which tracks the number of times the data storage device 12 has been connected in data communication with a host device 14 while offline (e.g., without connection with and authorization from the remote device 16 over the communications network 18). If the Offline Counter determines that the preset number of permitted offline connection occurrences has been reached, then the remote storage device 12 will be restricted/prevented from connecting in data communication with the host device 14 until further authorized by the remote device 16. It is noted that such authorization from the remote device 16 would necessitate the data storage device 12 and/or the host device 14 be connected with the remote device 16 over the communications network 18 (i.e., the data storage device would be required to be online).

Turning to the flowchart of FIG. 2 in more detail, the data storage device 12 can be physically connected/coupled to the host device 14 and powered on via electric power supplied by the host device 14 (e.g., over the USB connection). Next, a user of the data storage device 12 can enter an authorization password/PIN via the key input of the data storage device 12. If the authorization password/PIN is incorrect, the data storage device 12 determines whether the user has exceeded an initial number of permitted mismatches (e.g., as perhaps defined by a Mismatch Counter). The Mismatch Counter may be a software or firmware-implemented process which tracks the number of incorrect authorization passwords/PINs entered by the user. If the number of incorrect authorization password/PIN entered by the user exceeds the initial number of permitted mismatches, the data storage device 12 may be powered off (e.g., power is disconnected between the host device 14 and the data storage device 12 for a period of time).

Figure 3:
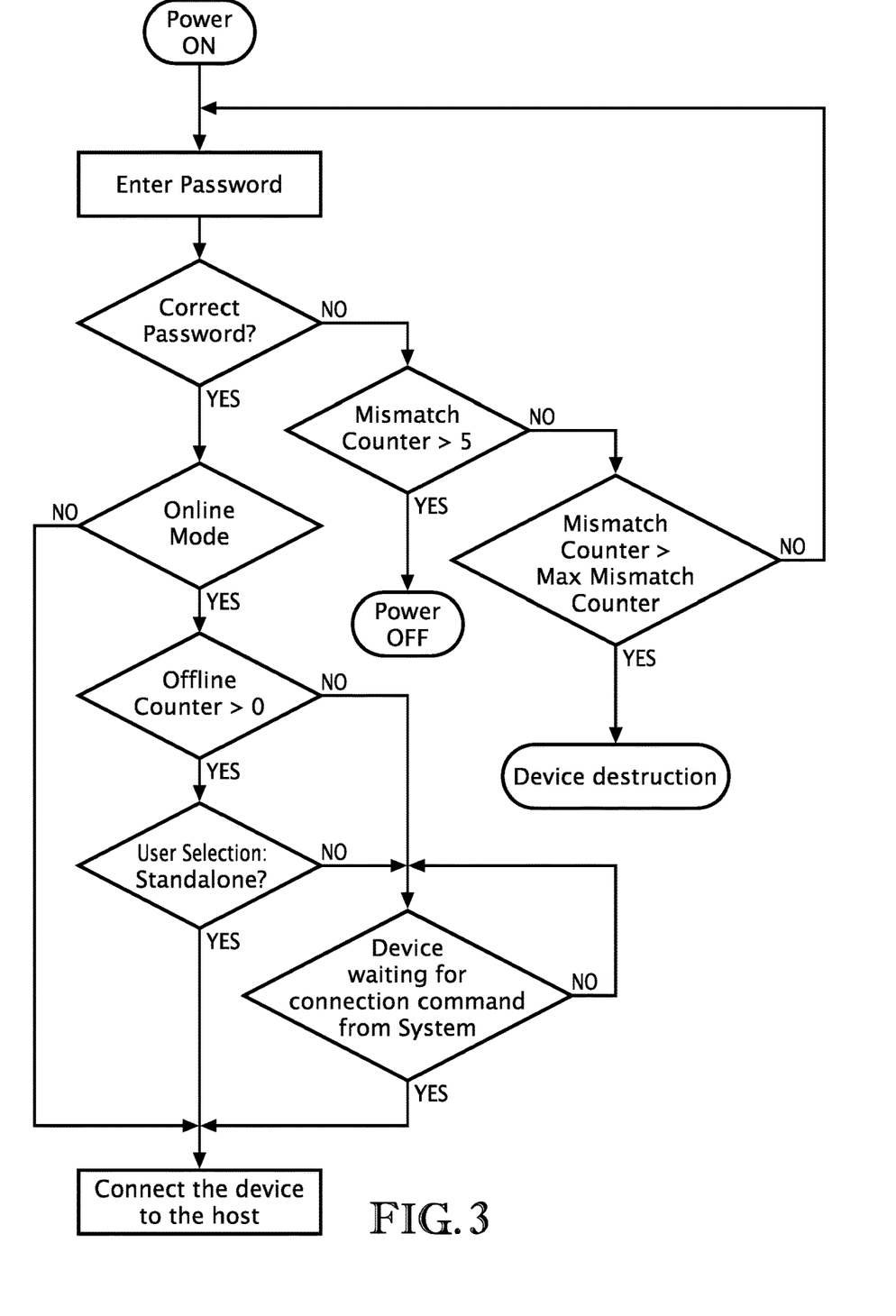
FIG. 3 depicts a flow chart showing how an exemplary data storage device may be utilized while in a Standalone Mode.

Although the flowcharts of FIGS. 2 and 3 illustrate the initial number of permitted mismatches (as tracked/managed by the Mismatch Counter) being set to "5", it should be understood that such setting is exemplary, and the initial number of permitted mismatches can be set to any value required by the user or administrator. Furthermore, embodiments of the Mismatch Counter may provide for the setting (i.e., preset) of a maximum number of permitted mismatches. If the user has exceeded the maximum number of permitted mismatches, the secure memory of the data storage device 12 may be self-destructed (e.g., deleted/wiped/destroyed), such that all data securely held on the data storage device 12 will no longer be accessible. In some embodiments, such as when the data stored on the secure memory is encrypted, destruction of the secure memory will comprise deletion of the encryption key used to encrypt the data stored on the secure memory. In some embodiments, the initial number of permitted mismatches of the Mismatch Counter may be set to "5", and the maximum number of permitted mismatches may be set to "10". However, the user and/or administrator of the data storage device 12 may configure the Mismatch Counter to include any number of initial or maximum permitted mismatches, as required.

To track and/or manage the number of incorrect authorization password/PIN entered by the user, the Mismatch Counter may use a mismatch value which is initially set to zero. The mismatch value may comprise a numerical number (or representation thereof) stored on one or more of the memory elements of the data storage device 12. The Mismatch Counter may increase the mismatch value upon each incorrect authorization password/PIN entered by the user, such that (i) the data storage device is temporarily powered off when the mismatch value reaches or exceeds the initial number of permitted mismatches (e.g., "5"), or (ii) the secure memory of the data storage device is self-destructed when the mismatch value reaches or exceeds the maximum number of permitted mismatches (e.g., "10"). In alternative embodiments, the mismatch value may initially be set at positive, non-zero value and reduced each time an incorrect authorization password/PIN entered by the user.

Remaining with FIG. 2, if the password/PIN is correctly entered by the user, the data storage device 12 will then determine if the data storage device 12 is in the Online Mode or the Offline Mode. In some embodiments, the data storage device 12 will be configured in either the Online Mode or the Offline Mode by an administrative user when the data storage device 12 has previously been successfully connected with the remote device 16 (e.g., via the software management system of the remote device 16). Alternatively, the user of the data storage device 12 may configure the data storage device 12 in the Online Mode or the Offline Mode directly via the data storage device 12. If the data storage device 12 is in the Offline Mode, then the data storage device 12 may be immediately authorized for data communication with the host device 14 (i.e., data can be transmitted to/from the data storage device 12 via the host device 14) without any further authorization necessary from the remote device 16. However, in some embodiments, the data storage device 12 may require additional authorization based on a security policy stored locally on the host device 14, even when the data storage device 12 is in the Offline Mode.

Alternatively, if the data storage device 12 is in the Online Mode, the data storage device 12 will be authorized for data communication with the host device 14 only if the data storage device 12 is either (1) offline (i.e., not connected to the remote device 16 over the communications network 18) and has been in data communication with the host device 14 fewer than the number of permitted offline connection occurrences, or (2) the data storage device 12 and/or the host device 14 are online (i.e., connected to the remote device 16 over the communications network 18), and the remote device 16 authorizes the data storage device's 12 data communication with the host device 14 (e.g., via the central management software on the remote device 16).

In the first situation, the data storage device 12 may determine (e.g., perhaps via an Offline Counter associated with the data storage device) if the data storage device has been in data communication with a host device 14 more than a permitted number of offline connection occurrences. Such a permitted number of offline connection occurrences may be a pre-established value set by the user or by the administrator of the data storage device 12. The Offline Counter may be a software of firmware-implemented process which manages or tracks the number of times the data storage device 12 has been connected in data communication with a host device 14 while offline (i.e., while out of communication with the remote device 16 over the communications network 18). To manage and/or track the number of times the data storage device 12 has been connected in data communication with a host device 14 while offline, the Offline Counter may use an offline occurrence value which may be set to the number of permitted offline connection occurrences. The offline occurrence value may comprise a numerical number (or representation thereof) stored on one or more of the memory elements of the data storage device 12. The Offline Counter may modify the offline occurrence value, such as by decreasing the offline occurrence value, upon each offline connection between the data storage device 12 and the host device 14. Upon the offline occurrence value reaching zero, the data storage device 12 will have reached the maximum number of permitted offline connection occurrences, such that the data storage device 12 will be restricted from connecting with the host device 14 in data communication until the offline occurrence value is reset by the data storage device 14 coming online for connection with the remote device 16 over the communications network 18. As such, the offline occurrence value of Offline Counter may be indicative of the remaining number of occurrences that the data storage device 12 is allowed to be connected in data communication with the host device 14 before further approval is required from the remote device 16. In alternative embodiments, the offline occurrence value may initially be set at zero and may be modified by the Offline Counter by being increased in value each time the data storage device 12 is offline and connects with the host device 14 (in data communication) until the number of permitted offline connection occurrences has been reached.

As an example, and with reference to FIG. 2, the maximum number of permitted offline connection occurrences may be five, which would provide for the data storage device 12 (when offline) to be authorized for data communication with the host device 14 five individual times before the data storage device 12 is required to be online and re-authorized by the remote device 16. As such, the offline occurrence value of the Offline Counter would be set to "5." Each time the data storage device 12 is offline and connected in data communication with the host device 14, the offline occurrence value will be reduced by one by the Offline Counter.

If the offline occurrence value is greater than zero, the data storage device 12 will be permitted to enter into data communication with the host device 14, even if the data storage device is offline.

Once the Offline Counter has reduced the offline occurrence value to zero, then the data storage device 12 will not be authorized for data communication with the host device 14 until the data storage device 12 is online and obtains further authorization from the remote device 16 (e.g., from the central management software of the remote device 16). To accomplish such further authorization, the data storage device 12 and/or the host device 14 will be required to be online so as to communicate with the remote device 16, e.g., via the communications network 18. If the data storage device 12 and/or the host device 14 is unable to be online to connect with the remote device 16 (e.g., because neither component is connected to the communications network 18), then the data storage device 12 will be restricted from data communication with the host device 14 until a connection with the remote device 16 can be made. Upon connecting with the remote device 16 and upon the data storage device 12 being authorized by the remote device 16 (e.g., from the central management software of the remote device 12), the data storage device 12 may be connected in data communication with the host device 14. In addition, upon such connection with and authorization from the remote device 16, the offline occurrence value of the Offline Counter of the data storage device 12 may be reset (e.g., to "5"), such that the data storage device 12 can again re-connect with the host device 12 for data communication up to the maximum number of permitted offline connection occurrences defined by the Offline Counter.

FIG. 3 shows an additional embodiment of the present invention whereby the data storage device 12 may also be configured in a Standalone Mode. The Standalone Mode may be a configuration that supplements the Online Mode (e.g., the data storage device 12 may be also be configured in the Standalone Mode when in the Online Mode). The Standalone Mode may be activated or deactivated by the user of the data storage device 12 and/or an administrator of the remote device 16. Nevertheless, when the Standalone Mode is available and activated, the data storage device 12 is permitted to connect with the host device 14 in the same manner described above with respect to the Online Mode (as illustrated in FIG. 2). For example, when the Standalone Mode is available and activated, the data storage device 12 is permitted to connect with the host device 14 when the maximum number of permitted offline connection occurrences has not been reached (e.g., as managed/tracked by the Offline Counter).

In contrast, if the Standalone Mode is available and not activated (i.e., deactivated), then the data storage device 12 and/or the host device 14 will be required to connect with the remote device 16 to obtain approval/authorization for the data storage device 12 to connect in data communication with the host device 14 (e.g., via the central management software of the remote device 16), even if the maximum number of permitted offline connection occurrences has not been reached (e.g., as managed/tracked by the Offline Counter). Thus, when the Standalone Mode is available and deactivated, the data storage device 12 will always be required to be online and will be required to obtain approval form the remote device 16 before the data storage device 12 can connect in data communication with the host device 14.

In view of the above, embodiments of the present invention include systems, devices, and computer-implemented methods for managing how a data storage device 12 can be connected with a host device 14 in data communication, so as to permit the host device 14 to read and write data from/to the data storage device 12. In an Offline Mode, the data storage device 12 can be connected in data communication with the host device 14 without the data storage device 12 and/or the host device 14 being online (e.g., via the communications network 18) or otherwise in communication with the remote device 16. Correspondingly, when the data storage device 12 is configured in the Offline Mode, the data storage device 12 is configured to connect in data communication with the host device 14 at any time, regardless of the offline occurrence value (corresponding with the number of permitted offline connection occurrences) as managed/tracked by the Offline Counter.

When in the Online Mode, the data storage device 12 can be connected in data communication with the host device 14 a maximum number of permitted offline connection occurrences (i.e., as defined by the Offline Counter) without the data storage device 12 and/or the host device 14 being online (e.g., via the communications network 18) or otherwise in communication with the remote device 16. Once the maximum number of permitted offline connection occurrences has been exceeded, the data storage device 12 and/or the host device 14 will be required to communicate with the remote device 18 to authorize communication between the data storage device 12 and the host device 12, as well as to reset the offline occurrence value associated with the Offline Counter.

In addition to managing how a data storage device 12 can connect in data communication with a host device 14 when the data storage device 12 and/or the host device 14 are offline, embodiments also provide for the device password/PIN of the data storage device 12 to be changed when the data storage device 12 and/or the host device 14 are offline. Such a device password/PIN may require changing, for instance, when the device password/PIN has been forgotten or lost by the user, or otherwise compromised (e.g., obtained by a bad actor).

Figure 4:
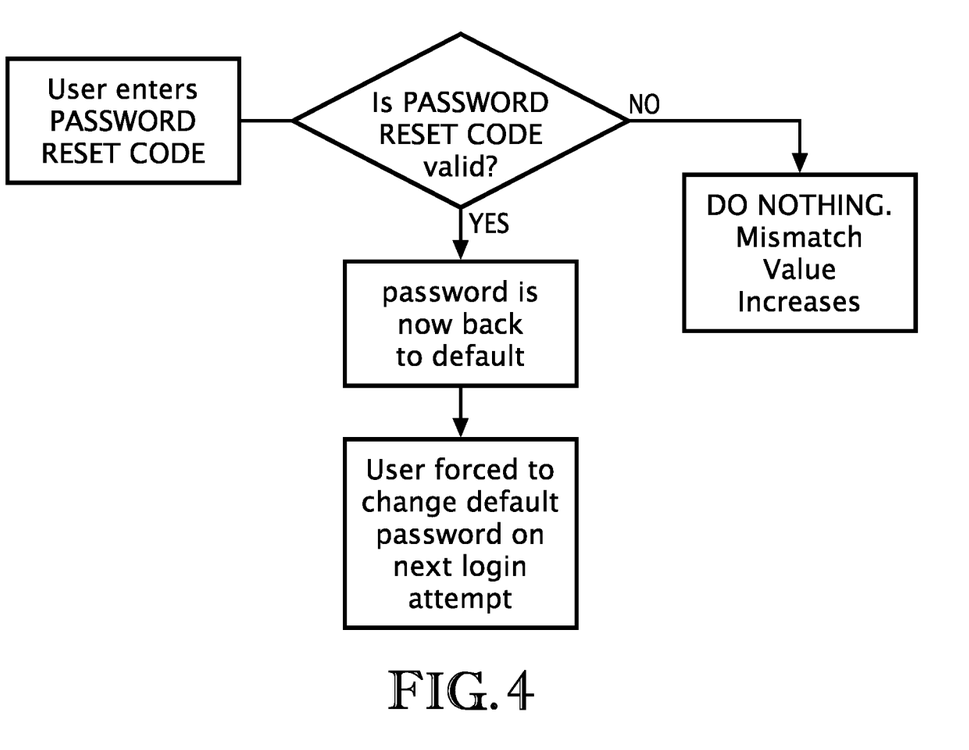
FIG. 4 depicts a flow chart showing how a user may change the device password/PIN of a data storage device using a password reset code.

In more detail, and with reference to FIG. 4, a user who has lost or otherwise requires to change the device password/PIN of the data storage device 12 may enter a password reset code ("PRC") via the key input of the data storage device 12. The PRC is a one-time use password/PIN that is stored on the data storage device 12 in addition to the device password/PIN. The PRC will permit the user to access the data storage device 12 even if the data storage device 12 is offline and not connected to the remote device 16 (e.g., the data storage device 12 and/or the associated host device 14 are offline without access to the communications network 18). In some embodiments, the data storage device 12 may need to be physically coupled with a host device 14 so as to obtain operating power from the host device 14 before the PRC will be functional.

The PRC may be in the form of a unique, one-time use alphanumeric code that was previously installed on, associated with, and/or stored on the memory elements of the data storage device 12 for purposes of accessing the data storage device 12 and/or changing the device password/PIN when necessary (e.g., when the original device password/PIN is lost or otherwise compromised). For example, the PRC may be installed and stored on the data storage device 12 during manufacture of the data storage device 12. Alternatively, the PRC may be generated at a later time by the remote device 16 (i.e., at such time when the data storage device 12 is connected online with the remote device 16) and installed and stored on the data storage device 12. If the user does not know the PRC, the user may be required to contact an administrator of the remote device 16 (e.g., via a telephone call or other communication protocol) to obtain the PRC. The PRC may be of any length of alphanumeric characters as desired. In an exemplary embodiment, the PRC may be formed from eight alphanumeric characters and can only be used one time.

As illustrated in FIG. 4, if the PRC entered by the user is incorrect, the mismatch value managed/tracked by the Mismatch Counter of the data storage device 12 may be increased, which may cause the data storage device 12 to be powered off or its memory to be self-destructed, as was described above. If the entered PRC is correct, the data storage device 12 will automatically reset its device password/PIN to a factory default password/PIN of the data storage device 12. The user may then use the factory default password/PIN to access the data storage device 12 (e.g., via the host device 14 to which the data storage device 12 is connected). In such instances, the user may be required to create a new password/PIN upon initial use. Nevertheless, upon successful authorization with the PRC, the data storage device 12 will be authorized for data communication (e.g., to read/write) with the host device 14, even if offline from the remote device 16 and even if the original device password/PIN was lost or otherwise compromised.

As noted above, the PRC is a one-time use password/PIN. As such, after using the PRC, the user will not be able to re-use the same PRC to re-set the device password/PIN a second time and/or to otherwise access the data storage device 12. However, once the data storage device 12 and/or the host device 14 (to which the data storage device 12 is connected) are able to connect with the remote device 16, via the communications network 18, the remote device 16 may create a new PRC, as discussed below.

Figure 5:
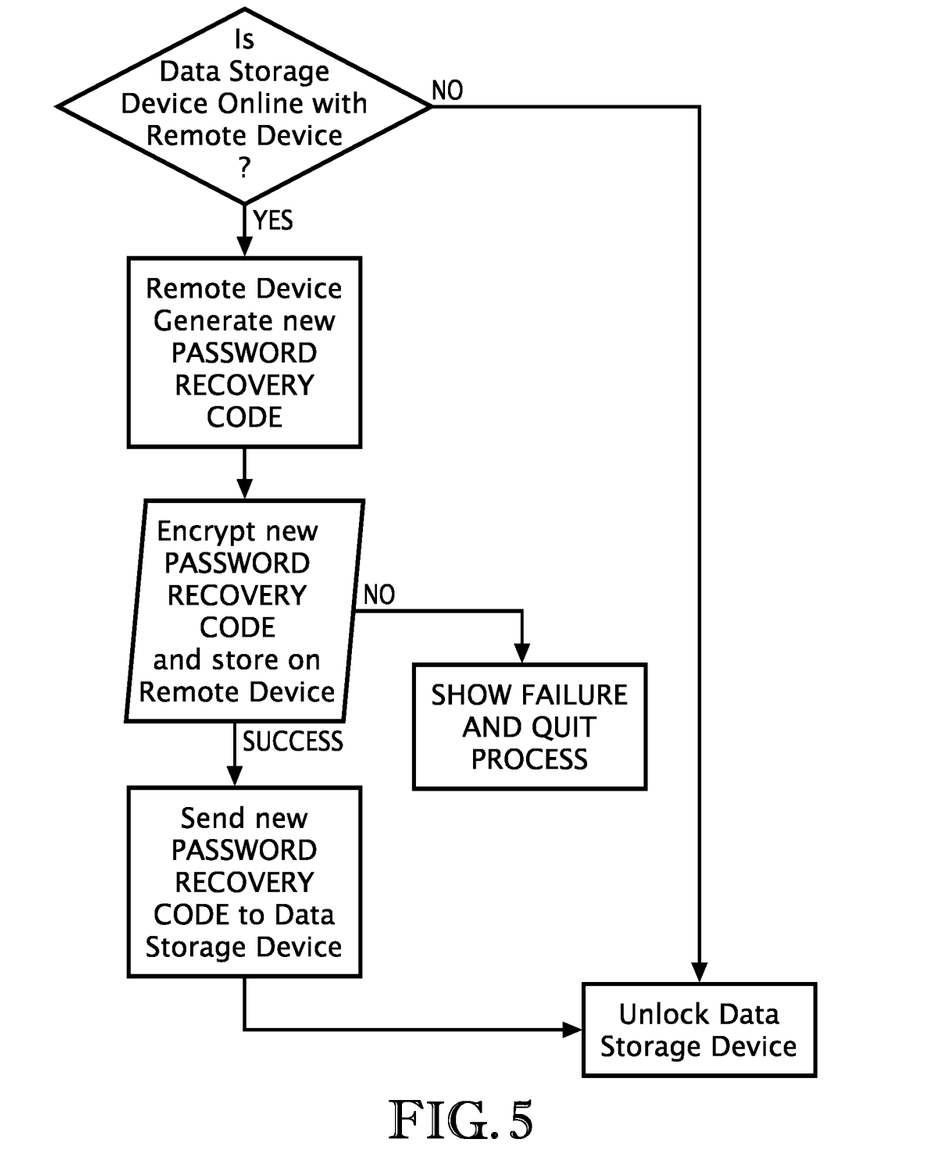
FIG. 5 depicts a flow chart showing how an exemplary remote device may generate a new password reset code.

Specifically, and with reference to FIG. 5, upon the data storage device 12 connecting with the remote device 16, the remote device 16 may determine that the existing PRC associated with the data storage device 12 was used and if so, will generate a new PRC for future use. The new PRC will be saved on the remote device 16 and on the data storage device 12. As such, the user of the data storage device 12 can use the new PRC to access the data storage device 12 and/or to change the device password/PIN of the data storage device 12, even when the data storage device 12 is offline (e.g., not in communication with the remote device 16 over the communications network 18).

The inventors hereby state their intent to rely on the Doctrine of Equivalents to determine and assess the reasonably fair scope of the present invention as it pertains to any apparatus not materially departing from but outside the literal scope of the invention as set forth in the following claims.

The invention claimed is:

1. A data storage device for securely storing data, said data storage device comprising:
   a secure memory configured to securely store data;
   a processor;
   a key input configured to receive information from a user; and
   a communications port configured to connect said data storage device with a host device,
   wherein said data storage device is configured to be managed by a remote device, wherein said data storage device is configured to connect with the remote device over a communications network,
   wherein the data securely stored on said secure memory is accessible by the user upon comparison of an authentication password entered by the user via said key input with a device password stored on said data storage device,
   wherein said data storage device is configured to
      store a password reset code on said data storage device, wherein the password reset code is a one-time use code;
      receive an input code from the user via said key input;
      validate, based on the password reset code, the input code received via said key input;
      reset the device password to a factory default password after the input code received via said key input has been validated;
      deactivate the password reset code for use with said data storage device;
      receive an updated device password for said data storage device via the key input;
      provide access to said secure memory of said data storage device, wherein said data storage device is configured to receive the updated device password and to provide access to said secure memory of said data storage device when said data storage device is offline and disconnected from the remote device; and
      upon said data storage device being online and connected to the remote device, store an updated password reset code on said data storage device.

2. The data storage device according to claim 1, wherein the updated password reset code is generated by the remote device.

3. The data storage device according to claim 1, wherein the device password is a first password, and wherein the password reset code comprises a second password.

4. The data storage device according to claim 1, wherein said data storage device comprises a portable device, and wherein said secure memory comprises a flash drive or a hard drive.

5. A computer-implemented method for changing a device password for a data storage device when the data storage device is offline and disconnected from a remote device, wherein data stored on a secure memory area of the data storage device is accessible by a user upon comparison of an authentication password entered by the user via a key input with a device password stored on the data storage device, wherein the data storage device is configured to be managed by the remote device, wherein the data storage device is configured to connect with the remote device over a communications network, said method comprising the steps of:
   storing a password reset code on the data storage device, wherein the password reset code is a one-time use code;
   receiving an input code via the key input of the data storage device;
   validating, based on the password reset code, the input code received via the key input;
   resetting the device password to a factory default password after the input code received via said key input has been validated;
   deactivating the password reset code for use with the data storage device;
   receiving an updated device password for the data storage device via the key input;
   providing access to the secure memory area of the data storage device upon receiving the updated device password, wherein the data storage device is configured to receive the updated device password and to provide access to the secure memory area of the data storage device when the data storage device is offline and disconnected from the remote device; and connecting with the remote device over the communications network and storing an updated password reset code on said data storage device.

6. The computer-implemented method according to claim 5, wherein the updated password reset code is generated by the remote device.

7. The computer-implemented method according to claim 5, wherein the device password is a first password, and wherein the password reset code comprises a second password.

8. A data storage device for securely storing data, said data storage device comprising:
- a secure memory configured to securely store data;
- a processor; and
- a communications port configured to connect said data storage device with a host device,
- wherein said data storage device is configured to be managed by a remote device, wherein said data storage device is configured to connect with the remote device over a communications network,
- wherein the data securely stored on said secure memory is accessible by the user upon comparison of an authentication password entered by the user via said key input with a device password stored on said data storage device,
- wherein said data storage device is configured to
- store a password reset code on said data storage device, wherein the password reset code is a one-time use code;
- receive an input code from a user of said data storage device;
- validate, based on the password reset code, the input code received from the user;
- reset the device password to a factory default password after the input code received via said key input has been validated;
- deactivate the password reset code for use with said data storage device;
- receive an updated device password for said data storage device from the user;
- provide access to said secure memory of said data storage device, wherein said data storage device is configured to receive the updated device password and to provide access to the secure memory of said data storage device when said data storage device is offline and disconnected from the remote device; and
- upon said data storage device being online and connected to the remote device, store an updated password reset code on said data storage device.

9. The data storage device according to claim 8, and wherein the updated password reset code is generated by the remote device.

10. The data storage device according to claim 8, wherein the device password is a first password, and wherein the password reset code comprises a second password.

* * * * *